June 14, 1966     R. E. PICKETT ETAL     3,256,512
REMOTE SIGN CONTROL SYSTEM
Filed June 5, 1962     14 Sheets-Sheet 1

INVENTOR.
ROBERT E. PICKETT
EDWARD F. POSHADEL
BY

June 14, 1966  R. E. PICKETT ETAL  3,256,512
REMOTE SIGN CONTROL SYSTEM
Filed June 5, 1962  14 Sheets-Sheet 2

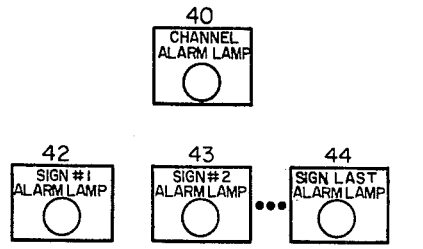

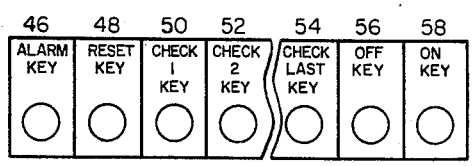

| | ICING | FOG AHEAD | RAIN AHEAD | ACCIDENT AHEAD | ROAD WORK AHEAD | SPEED LIMIT | STAY AWAKE | FLASHERS | AREA LIGHTS | TRAFFIC STOPPED |
|---|---|---|---|---|---|---|---|---|---|---|
| SIGN #1 LOCATION | PT1 | PT2 | PT3 | PT4 | PT5 | PT6 | PT7 | PT8 | PT9 | PT10 |
| SIGN #2 LOCATION | PT11 | PT12 | PT13 | PT14 | PT15 | PT16 | PT17 | PT18 | PT19 | PT20 |
| | | | | | | | | | | |
| | | | | | | | | | | |
| | | | | | | | | | | |
| | | | | | | | | | | |
| | | | | | | | | | | |
| | | | | | | | | | | |
| SIGN LAST LOCATION | PT81 | PT82 | PT83 | PT84 | PT85 | PT86 | PT87 | PT88 | PT89 | PT90 |

CONTROL STATION PANEL 38

FIG. IA

*INVENTOR.*
ROBERT E. PICKETT
EDWARD F. POSHADEL

June 14, 1966   R. E. PICKETT ETAL   3,256,512
REMOTE SIGN CONTROL SYSTEM
Filed June 5, 1962   14 Sheets-Sheet 3
ESCUTCHEON FOR SIGN #1 POINT #2
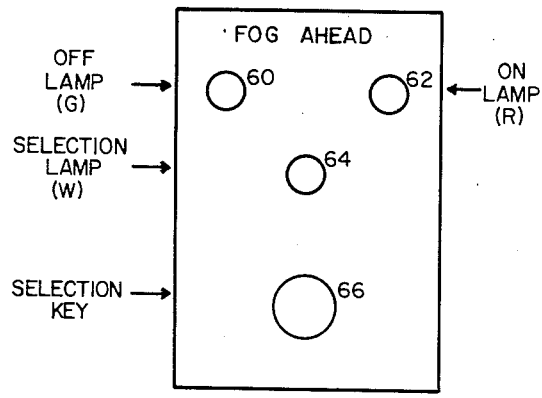
FIG. IB
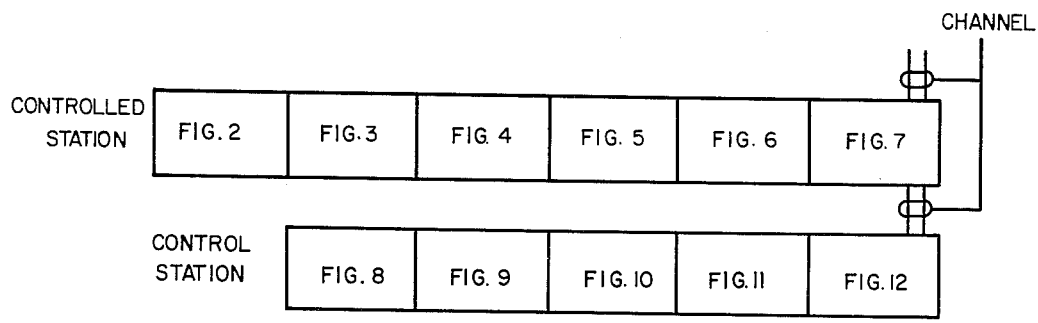
FIG. 13
*INVENTOR.*
ROBERT E. PICKETT
EDWARD F. POSHADEL
BY June 14, 1966 R. E. PICKETT ETAL 3,256,512
REMOTE SIGN CONTROL SYSTEM
Filed June 5, 1962 14 Sheets-Sheet 4
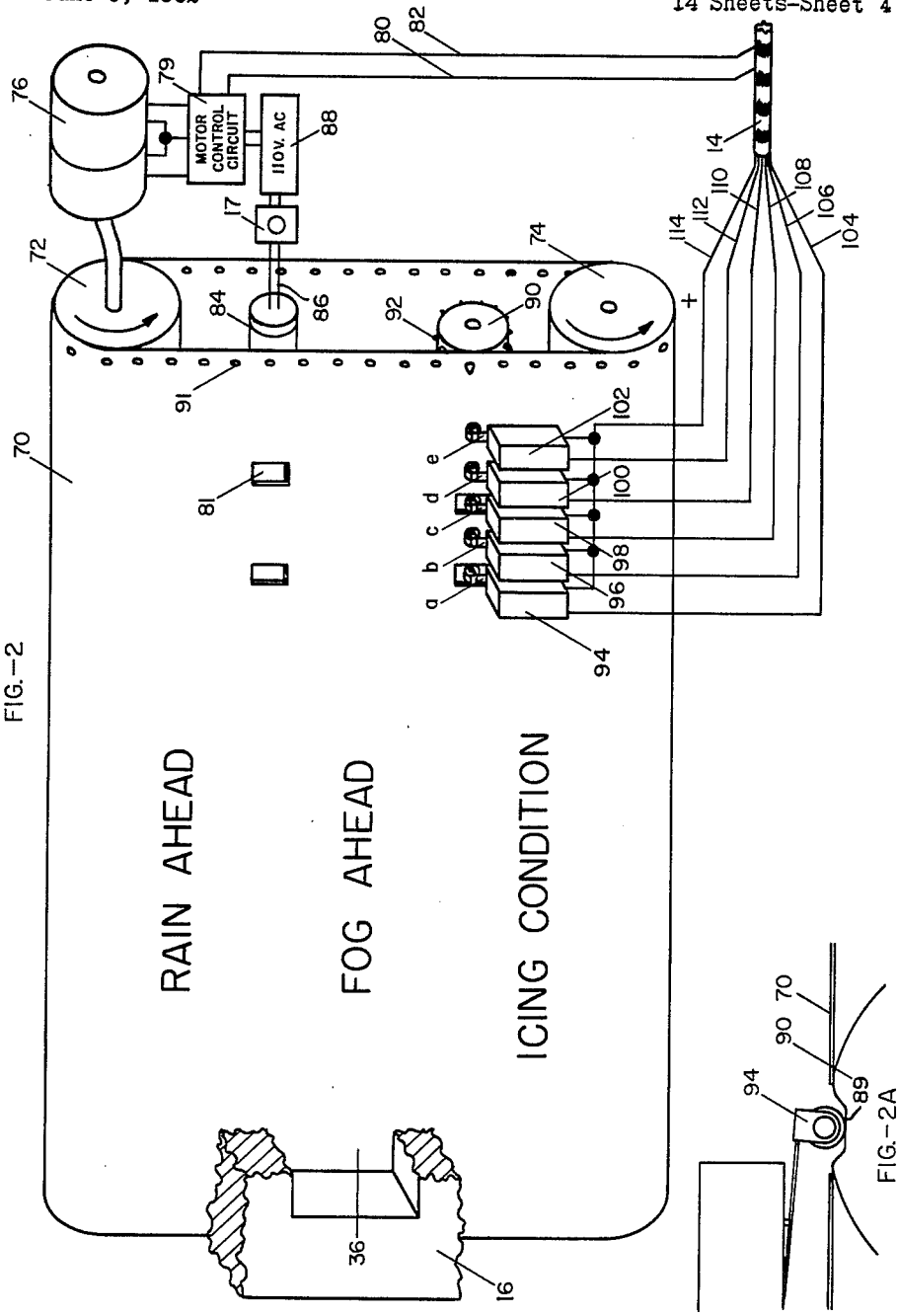
INVENTOR.
ROBERT E. PICKETT
EDWARD F. POSHADEL
BY

INVENTOR.
ROBERT E. PICKETT
EDWARD F. POSHADEL
BY

INVENTOR.
ROBERT E. PICKETT
EDWARD F. POSHADEL
BY

INVENTOR.
ROBERT E. PICKETT
EDWARD F. POSHADEL

INVENTOR.
ROBERT E. PICKETT
EDWARD F. POSHADEL

United States Patent Office 3,256,512
Patented June 14, 1966

3,256,512
REMOTE SIGN CONTROL SYSTEM
Robert E. Pickett and Edward F. Poshadel, Galion, Ohio, assignors to North Electric Company, Galion, Ohio, a corporation of Ohio
Filed June 5, 1962, Ser. No. 200,218
5 Claims. (Cl. 340—22)

The present invention is directed to a supervisory remote control system for display media, and specifically to a system having a central station for controlling the displays of signs located along a roadway at remote locations.

As a result of experience with an increasing number of high-speed turnpikes, freeways, roadways and the like, it has become apparent that in the interest of safety there is a definite need for remotely controlled visual signs for displaying warnings to the motorists well in advance of the location at which an adverse condition exists. That is, the motorist who drives along at high speeds for relatively long periods will not always be conditioned to react properly as an adverse condition is suddenly encountered, and as a result, definite hazards exist on a highway which do not properly warn the motorists of such conditions. A few examples of occurrences which merit advance warning are bad road conditions, accidents on the road, variable traffic conditions, significant weather changes, speed variables, and many others.

In the novel display system disclosed herein a master control station is located at some central point which might, for example, be an attended toll-point, and a series of highway signal signs are spaced therefrom along the road at convenient intervals, the signs being located at such points as to be readily observed by the motorist. The main station is connected to the signs by a single channel which might be a wire pair, and signals transmitted thereover to the signs permit adjustment of any sign in the system to display the information desired and to retain such display until further signals are transmitted from the master control station. When the signs are not actually carrying warning messages, standard safety reminders may be displayed, including speed limit reminders and safety suggestions as to careful driving, etc. At certain of the sign locations telephone equipment may be located to permit ready communication over the two wire channel to the control station.

While various types of display systems controlled from the central office have been heretofore attempted, each of such systems has included various disadvantages and shortcomings. In one such form of system, for example, sign boards were disposed along the highway at spaced intervals, each of which comprised a display sign having a large number of light bulbs in which messages were displayed by illuminating the bulbs in various combinations. The primary disadvantages of such arrangement are the high cost of the equipment, the poor legibility of such form of display in the bright sunlight, the high maintenance cost in the matter of servicing the signs (frequent bulb replacement) and the high power requirements for the sign. It is one object of the present invention, therefore, to provide a new and novel system in which good visibility of display signs is achieved either in bright sunlight or in darkness, while yet requiring a minimum of power, reduced maintenance and low initial cost.

It is yet another object of the invention to provide a control system in which the display signs at each of the stations are expeditiously controlled to provide the desired display, and in which such control is effected over a single channel which might be a wire pair which extends from the central control panel to each of the road way signs located along the stretch of road to be supervised in such manner.

It is yet another object of the invention to provide a display system of such type in which coded impulse operation is utilized to preclude the possibility of erroneous pulsing, and in which a self-checking system is employed to eliminate the possibility of a wrong display of traffic information.

It is an additional object of the present invention to provide a display sign at a remote station which provides coded signals representative of the message displayed on the sign, and circuitry means at the remote station controlled by the coded signals to transmit signals over the channel to the central office to identify the message displayed by the sign.

These and other objects of the invention will be apparent from the following description and accompanying drawings which serve to illustrate the various exemplary embodiments thereof in which:

FIGURE 1 sets forth the novel system, in block form, including the central office control station and the channel which interconnects a plurality of controlled stations located at spaced intervals along a roadway to control the information which is displayed by display signs associated therewith;

Figure 1:
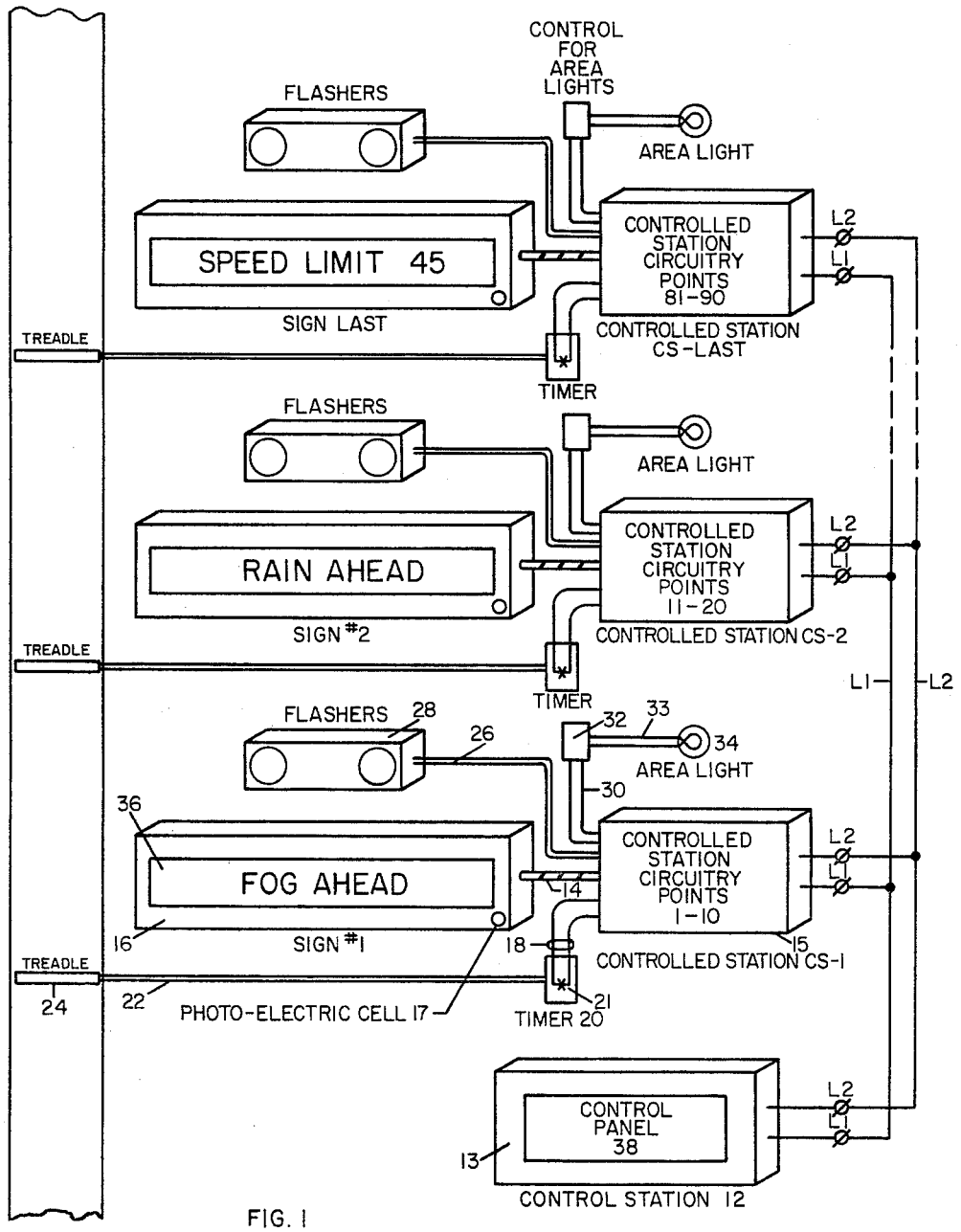
FIGURE 1A is a front view schematic illustration of a control panel at the control station including the escutcheon plate for each of the functional points in the system.
FIGURE 1B is a detailed front view of the escutcheons on the control panel of FIGURE 1A showing the controls which are provided by the different points in the system.

FIGURES 2, 2A, and 3-7 schematically set forth the equipment for one of the controlled stations shown in FIGURE 1;

FIGURES 8-12 schematically set forth the equipment for the control station shown in FIGURE 1; and FIGURE 13 sets forth the manner in which FIGURES 2-7 and 8-12 are arranged with one another to set forth the equipment at the control and controlled stations.

*General description*

With reference to FIGURE 1, a section of the road 10 to be protected by display signs located along the roadway is shown thereat. The control system for controlling the signs in the provision of such protection basically includes a Control Station 12 and a plurality of Controlled Stations CS–1 to CS-Last disposed at spaced locations along the road and interconnected by a channel comprising a single wire pair.

Each Controlled Station, such as CS–1 includes a housing 15 of a weathertight construction for enclosing the control circuitry for the equipment at the location which may include a display sign, such as sign 16, at the first Controlled Station CS–1 connected to the control circuitry over cable 14; a traffic movement detection device which may comprise, for example treadle 24 located in the path of the vehicles on the roadway 10, connected over conductors 22 to timer 20 which is connected over conductors 18 to the control circuitry in housing 15; a flasher device 28 which is connected over conductors 26 to the control circuitry, and area lamp(s) 34 connected over conductors 33 to a power source 32 which is connected over control conductors 30 to the control circuitry in housing 15 for control thereby. Each sign may also include a photoelectric cell 17 located on the housing of sign 16 which is operative to effect automatic illumination of the display indicia whenever a predetermined darkness level occurs in the area. Each controlled station may be similarly equipped, or may have a smaller or larger combination of the disclosed devices (or different devices) connected for control of the circuitry at each of the stations.

In one embodiment, the display signs, such as 16, are to be located at spaced intervals of approximately three to five miles along the roadway 10 each sign having a window or display area 36 which is approximately twelve feet long, and one and one-half feet high, whereby messages of approximately one foot in height may be displayed to the motorist. As shown hereinafter, each sign may be adapted to display warning signals such as FOG AHEAD, ACCIDENT AHEAD, SPEED LIMIT 45, ICING CONDITIONS, as well as reminder signs, such as STAY AWAKE, and many others which are appropriate for the different locations. As shown hereinafter, the control circuitry in housing 15 may be controlled by an attendant at the Control Station 12 to effect movement of any of a number of legends into the display area 36.

The control circuitry may also be controlled by the attendant to operate the flasher devices 28 located adjacent the sign for the purpose of directing the attention of the motorist to the message displayed on the sign. Additionally, the attendant at the central control station may control the circuitry in housing 15 to energize the area light 34 located in the vicinity of the sign. Traffic detection equipment including treadle 24 at the controlled station, as shown in more detail hereinafter, provide automatic reporting of traffic movement. Similar points may be used, if desired, to provide manual or switch reporting to the central office, telephone communication between the stations in the system, and other similar reporting functions.

The control circuitry in each of the Controlled Stations CS-1 to CS-Last is schematically shown in FIGURES 3-7. The control circuitry in the Control Station 12 is schematically shown in FIGURES 8-12.

The novel circuitry which is operative in the provision of the improved form of control described herein is shown in detail in the copending application which was filed July 11, 1960, having Serial No. 42,087, and which is assigned to the assignee of the present invention. The present disclosure is set forth in sufficient detail for a party skilled in the art to understand the invention, and reference is made to the copending application for such further refinements of the circuitry which may be included to provide variations of the supervisory and control functions disclosed herein.

As shown in FIGURE 1, the Control Station 12 is connected to controlled equipment at each of a number of Controlled Stations, a different group of points being located at each of the remote stations CS-1 to CS-last. Thus, the first group of points 1-10 is located at Controlled Station CS-1, the second group of points 11-20 is located at Controlled Stations CS-2, etc.

The Control Station equipment effects control of the equipment at a point of a group at a remote station by the transmission of codes over the two wire channel L1-LT to the remote station CS-1 to CS-last. In the disclosed arrangement, pulse codes consist of six marking pulses with five spaces available between the marking pulses. Variation in the different codes is effected by elongated two out of five of the spaces, different pairs of elongated spaces providing different coded signals. Each code received at the remote Controlled Station (or the Control Station) is checked to insure that there are six (and only six) pulses in a code and that there are two (and only two) elongated spaces in the code. In the event of any variation, the equipment automatically provides an alarm. The pattern of the codes transmitted is described more fully hereinafter.

As shown in FIGURE 1A, the central office 12 includes a control panel 38 for use by the attendant in controlling the operation of equipment at each of the remote stations CS-1 to CS-last and for providing indication to the attendant of the condition of the remotely located equipment. The control panel 38 shown hereinafter includes a panel escutcheon for each point of a group, and each group of points is assigned to provide control of and reporting for one of the remote stations. As now shown, the attendant can individually select any sign in the system and can effect control of such sign to display any one of a large number of messages. The system additionally provides a continuous indication on the control panel 38 of the messages which are displayed on each of the signs, and provides automatic reporting of and indication of traffic flow at the different points, as well as control of the additional equipment at the sign locations including area lights, flashers, and the like.

The control panel 38 which is utilized by the attendant at the Control Station 12 to effect the desired display of the signs at the different positions in the system, as shown in FIGURE 1A includes escutcheon plates for each of ninety points PT1–PT90, for example, the first group of points 1–10 being assigned for use in the control of the equipment at Controlled Station CS–1 including Sign 1, the second group of points 11–20 is used to control the equipment at Controlled Station CS–2, etc.

As shown in FIGURE 1, the first seven points for Station 1 are assigned to control the display of a different message by Sign 1 including ICING CONDITIONS, FOG AHEAD, RAIN AHEAD, ACCIDENT AHEAD, ROAD WORK AHEAD, SPEED LIMIT 45, STAY AWAKE. Point 8 is assigned for use in control of the flasher equipment 28 at Sign 1. Point 9 is used in the control of the area lights in the vicinity of Sign 1, and point 10 is used for traffic movement reporting purposes.

An escutcheon plate for a point, such as Point 2 (Sign 1) in the system is shown in more detail in FIGURE 1B. As there shown, the point is used to control Sign 1 in the display of FOG AHEAD, and includes green OFF lamp 60, red ON lamp 62, a white selection lamp 64 and a selection key 66. In the event that the FOG AHEAD sign is presently displayed at Sign 1, the red lamp (ON) 62 is energized, and in the event the FOG AHEAD legend is not displayed by the sign the green lamp 60 (OFF) is energized.

Common equipment on the panel for use with the point selection equipment includes a channel alarm lamp 40 which lights in case of channel failure, and an alarm bell (not shown) which is energized with the alarm lamp with the occurrence of a channel failure. Alarm key 46 permits silencing of the bell by the attendant. An alarm lamp, such as 42, 43, etc., is assigned to each Controlled Station whereby an automatic reporting such as that at the traffic point (Point 10 in the present example) for each station will notify the attendant that the traffic flow has stopped in the vicinity of the particular Controlled Station. That is, as illustrated alarm lamp 42 will be energized to indicate to the attendant that traffic has stopped in the vicinity of Sign 1, alarm lamp 43 will be energized to indicate that traffic movement has stopped at Sign 2, etc.

Check keys 50, 52, 54, etc., are provided for each of the groups of points, each check key permitting the attendant to make a check of the condition of the equipment at the various sign locations. Thus, Check Key 50 will automatically cause the system to cycle the points 1–10 assigned to the first station, check key 52 will cycle the points 11–20 assigned to the second station, etc.

The ON key 58 is used in conjunction with the selection keys for the different points in the different groups to control operation of the equipment at the selected point. Briefly, with depression of selection key 66 (FIGURE 1B) at a point such as Point 2 for Station 1, the control circuitry operates to effect selection of the point, and the white lamp selection 64 is energized. As soon as the white selection lamp 64 is energized to indicate to the attendant that the point has been selected, the attendant operates the ON key 58 (FIGURE 1A), the circuitry will effect operation of the sign to display FOG AHEAD, the green lamp 60 will be extinguished, and the red lamp 62 will be energized. The red lamp remains on until such time as a different point is selected to effect the display of different information.

Thus, the attendant operates the ON key 58 to control the equipment at Sign 1 location to advance the sign FOG AHEAD into the display area 36 on the sign. The ON key may be used with the selection key for each of the first seven points of each group to effect a change in the message displayed by a sign. In the event that flasher point 8 of one of the groups is selected, the operation of the ON key 58 will cause the flashers at the selected sign to be energized, and in the event that the ninth point (area light) of a group is selected the operation of the ON key effects energization of the lamps in the areas which are to be controlled from the central office.

The OFF key 56 is not used with the first seven points of the sign, but may be used in conjunction with the eighth point to turn off the flashers, and may be used with the ninth point to turn off the area lights.

The reset key 48 effects return of the system to the normal position with all points held in the position last selected. Thus, if the attendant makes a point selection by operating a point selection key, such as FOG AHEAD for Sign 1 (Point 2, Group 1) and decides that the wrong selection has been made, or that a different selection is desired, the reset key 48 may be operated to restore the system to a position in which the desired selection may be accomplished. Each of the keys 46–58 and each of the point selection keys for the different points in the system are of the nonlocking type.

The flasher equipment 28, the area light equipment 32, 34 and the traffic flow equipment 24, 26 at each Controlled Station, such as CS–1, are commercially available units. The display sign, such as Sign 1 at Station 1, is of the type which may be selectively adjusted to display a number of different legends, and to provide an indication of the particular legend which is being displayed at any given time. The operating portion of one such unit is schematically shown in FIGURE 2, and as there shown comprises an endless Mylar belt 70 having a number of different messages, such as RAIN AHEAD, FOG AHEAD, ICING CONDITION, etc., laterally disposed at successive intervals along the belt length, and a series of perforations 91 located along one of its marginal edges. A group of two code apertures 81 are provided adjacent each legend on the belt for a purpose to be more fully described. The endless belt 70 is supported by a pair of spaced aluminum rollers 72, 74, the upper roller 72 having a shaft 78 connected to be driven in a counterclockwise direction by an electric motor 76. The electric motor 76 has two windings, one of which is connected in opposition with the other, which are connected to a motor control circuit 79 which is in turn connected to a 110 volt alternating current source 88. The motor control circuit 79 is energized responsive to completion of a circuit over conductors 80, 82 which are connected over cable 14 to the control circuitry in housing 15.

A fluorescent lamp 84 is disposed inwardly of the belt 70 and in alignment with the window area 36 on the Sign 16, and is electrically connected via conductors 86 to a photoelectric cell control unit 17 which in turn controls the connection of the 110-volt alternating current source 88 to the lamp 84, whenever the light level in the vicinity of the housing decreases to a predetermined level. Lamp 84 is thus effectively energized to illuminate the indicia on the belt 70 which is located in the display area 36 of the housing 16.

Such arrangement permits the use of opaque letters (of different colors, if desired) on the belt 70 which are clearly visible, even in bright sunlight. Additionally, the use of the economical-type fluorescent lamp 84 to illuminate the messages on the belt 70 insures excellent legibility even in the darkest surroundings, at a minimum cost. The use of a photoelectric control cell 17 in the circuit for lamp 84 results in automatic control of the sign illumination as the light conditions vary in the vicinity of the sign.

A third aluminum roller or cylinder 90 having a lateral groove 89 (FIGURE 2A) is supported inside the endless belt 70, and teeth 92 located at one end of the aluminum roller 90 engage perforations 91 located along the one marginal edge of belt 70 to rotate roller 90 through one revolution with movement of the belt through the distance which exists between two successive legends on the belt.

A set of five position detector means including microswitches 94, 96, 98, 100 and 102 are supported outside the belt 70 with feeler arms a–e having rollers at the end thereof disposed to engage the five different positions on the belt 70, at which the code apertures, such as 81, may be located additionally in cooperating relation with grooves on roller 90. Thus, as noted above, each legend on the belt 70 has code apertures located in two of five possible positions in the coded area for such legend. As shown in more detail hereinafter, as a legend is moved into position relative to the display area, the two rectangular apertures for such legend will permit a corresponding pair of the rollers of the arms a–e on the microswitches 94–102 to pass through the belt and into the cooperating groove 89 on the roller 90 (FIGURE 2A), which move into register with the feeler arms a–e whenever, and only whenever, a legend is moved into the display area 36. The two microswitches of the five which are operative in such manner extend positive potential on conductor 114 to the corresponding pair of the five conductors 104, 106, 108, 110, 112 and to the control equipment in the associated Controlled Station CS–1.

In one embodiment, the codes (assuming the aperture positions are numbered 1–5, reading from left to right) were assigned as follows:

| | |
|---|---|
| ICING CONDITION | 1, 2 |
| FOG AHEAD | 1, 3 |
| RAIN AHEAD | 1, 4 |
| ACCIDENT AHEAD | 1, 5 |
| ROAD WORK AHEAD | 2, 3 |
| SPEED LIMIT 45 | 2, 4 |
| STAY AWAKE | 2, 5 |

With reference now to FIGURES 3–7, the manner of connection of the marking conductors to the control equipment at the Controlled Station contained in housing 15 is schematically shown thereat. As noted above, the circuitry is disclosed in detail in the copending application, and accordingly the present disclosure is directed to a disclosure of the additional components and their connection to the previous system. Like identification legends have been used in the two disclosures in most instances.

Figure 3:
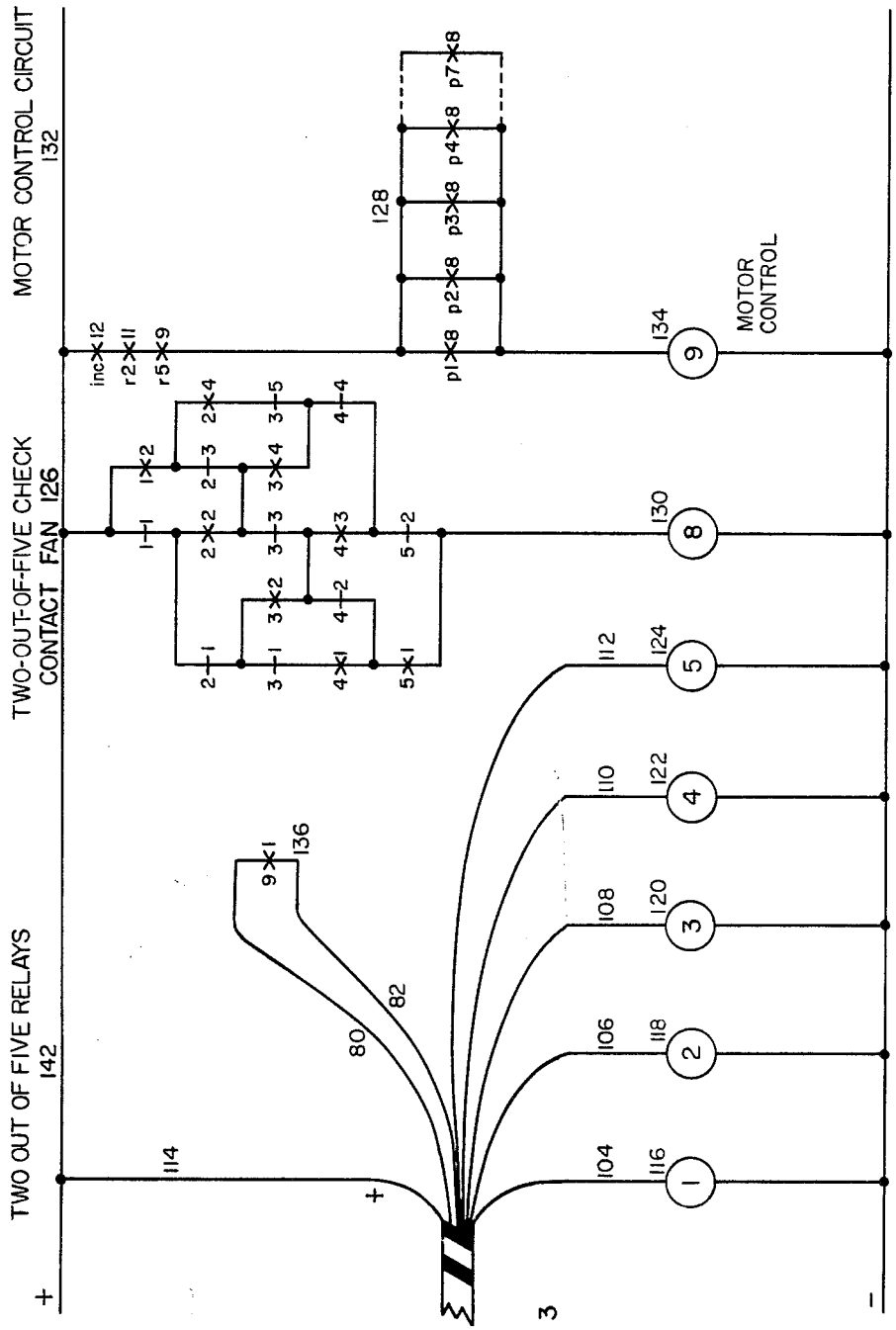
Figure 4:
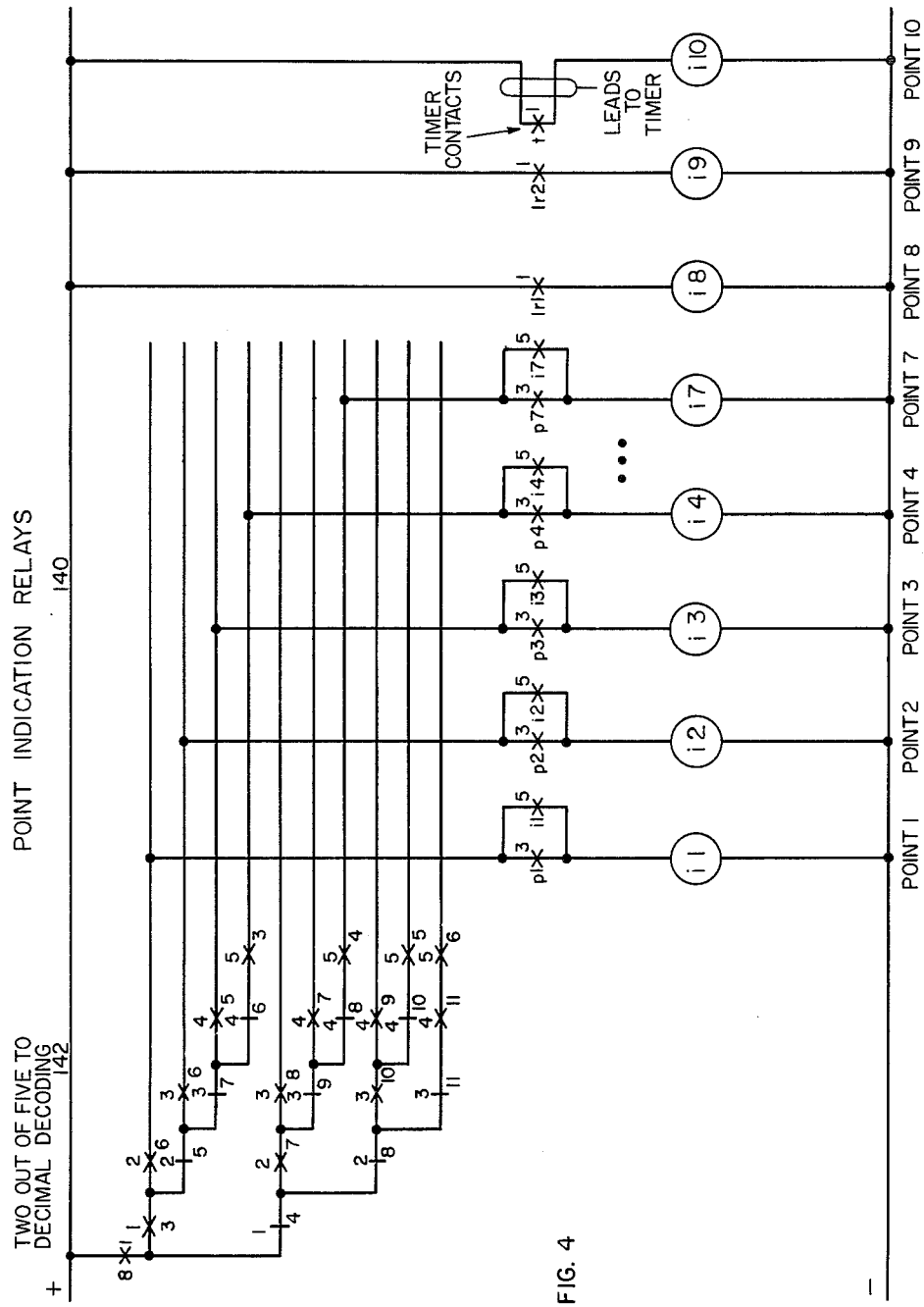
Figure 5:
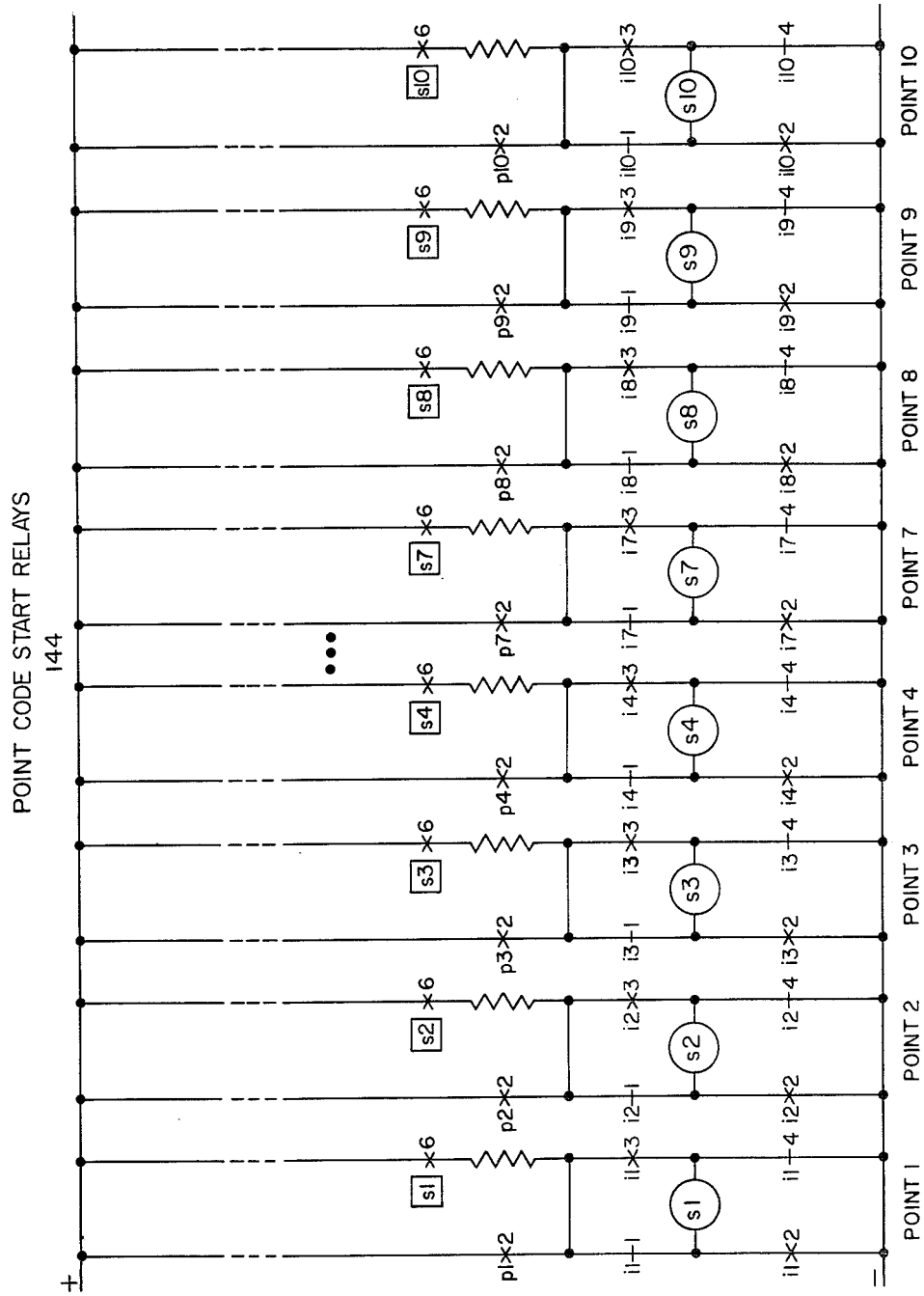
Figure 6:
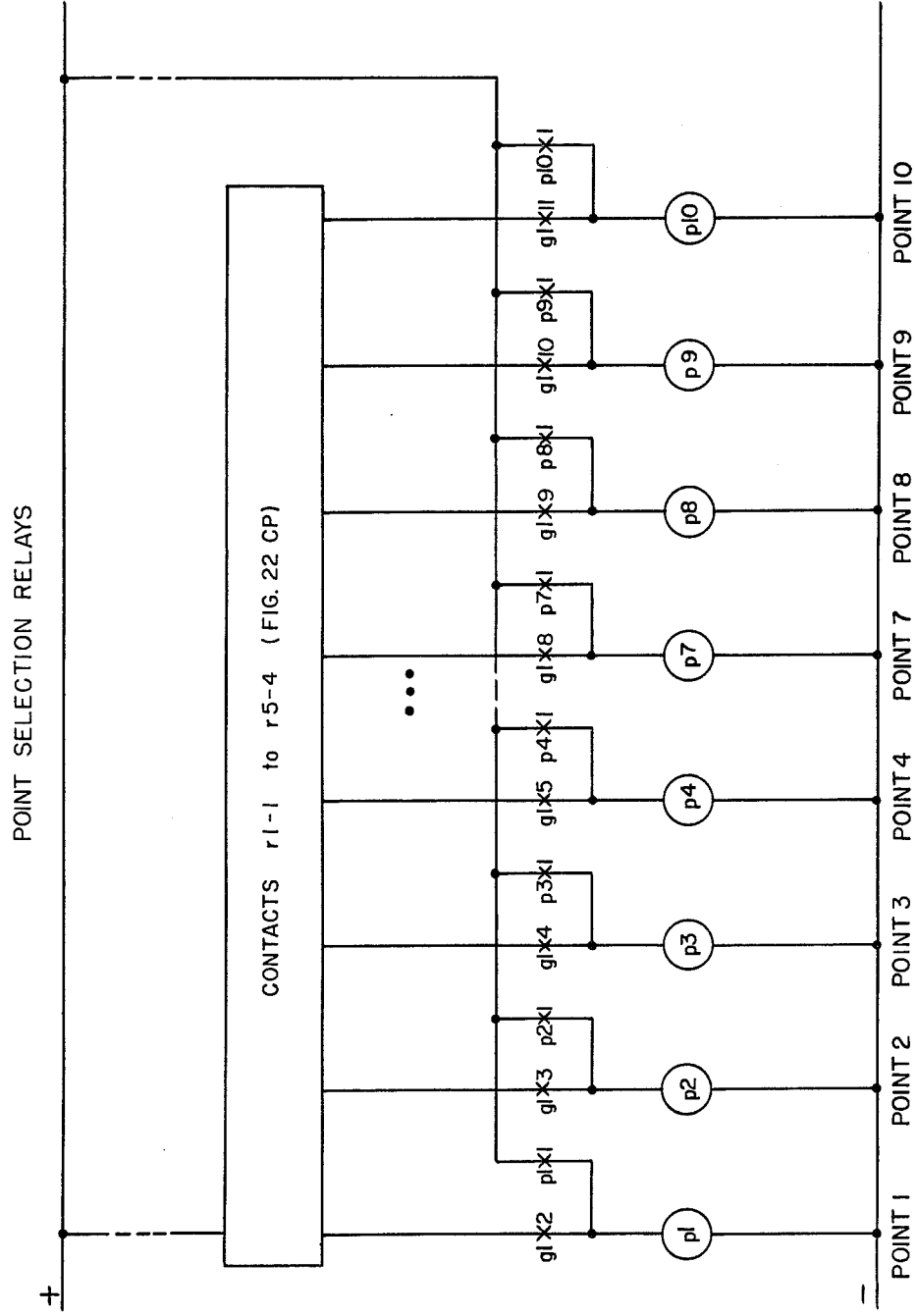

As shown in FIGURE 3, a motor control relay 134 which is energized over the contacts p1–8, p2–8, etc., of the point selection relays whenever one of the first seven points is selected by transmission of the assigned code signal from the Control Station 12. Motor control relay at its contacts 136 controls energization of motor circuit 79 for sign motor 76 and rotation of Sign 70. As the sign moves a legend into the display area, the code markings for such legend are detected by microswitches 94–103 and conductors 104–112 are marked to identify the displayed legend. A set of marking relays 116–124 (FIGURE 3) are thus operated in a two out of five pattern by the markings on conductors 104–112. The contacts 1–1, 1–2 to 5–1, 5–2 on marking relays 116–124 are connected in a check contact fan 126 to control operation of a code check relay 130 only with the operation of two of the five relays 116–124. A second set of contacts 1–3, 1–4, etc., (FIGURE 4) are connected in a decimal decoding fan to control operation of the one of the ten point indication relays 140 which is assigned to the legend displayed on the sign.

The point indication relays 140 (*i*1–*i*10) are operative to provide an indication of the condition of the devices at the different points for the station CS–1. That is, decoding fan 142 (FIGURE 4) which is controlled by the marking relays 116–124 (FIGURE 3), decodes the signals received from the sign and operates the one of the indication relays 140 for the point which is assigned to such legend. As an example, if Point 2 is assigned to the legend FOG AHEAD, as the sign moves such legend into the display area 36 (FIGURE 2) the rollers of microswitch arms *a, c* will engage the apertures at positions 1 and 3, relays 116, 120 will be energized, and decoding circuit 142 will operate the point indication relay *i*2 for Point 2.

The control circuitry at Controlled Station CS–1 also includes a set of point code start relays 144 (relays *s*1–*s*10 in FIGURE 5) which are identical to relays *s*1–*s*10 disclosed in the copending application. As described more fully hereinafter, and in the copending application, the relays *s*1–*s*10 are each assigned to a different one of the points 1–10 respectively, and each is operative responsive to a change in the position of the indication relay *i*1–*i*10 (FIGURE 4) for its point to initiate transmission of an outgoing code to the Control Station to indicate the nature of the change.

The point selection relays 146 (relays *p*1–*p*10 in FIGURE 6) are similar to the point selection relays *p*1–*p*10 of the copending application, and each is assigned to select a different one of the points whenever the incoming code received at the Controlled Station indicates that its point is to be selected for operational purposes.

The Controlled Station CS–1 also includes point control relays 148 (FIGURE 7) including an off-on latch relay 150 at Point 8 for controlling operation of the flashers 28 at the associated station, and a latch relay 152 at point 9 for controlling the energization of the area lights in the vicinity of the station.

Figure 7:
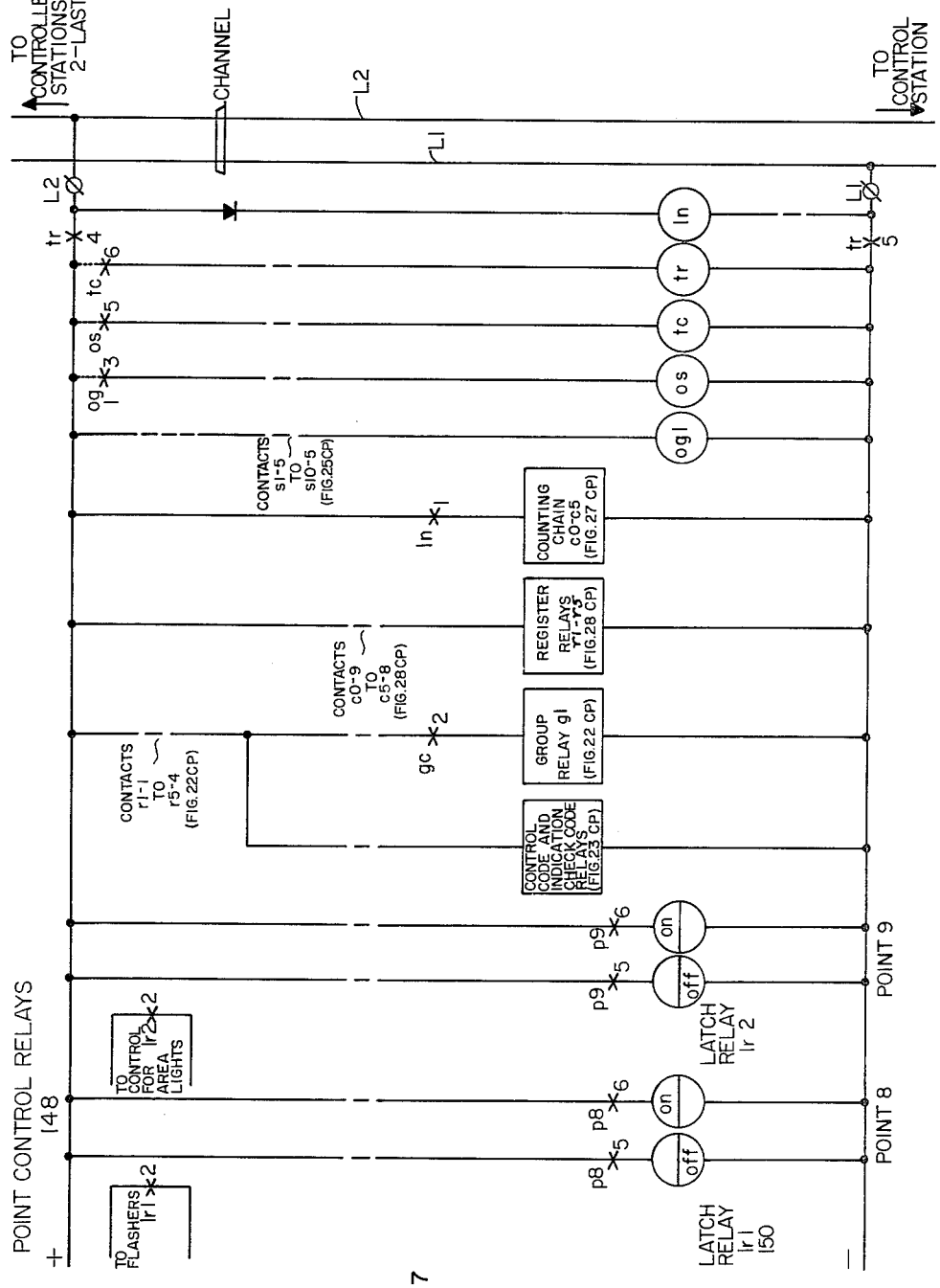
Figure 8:
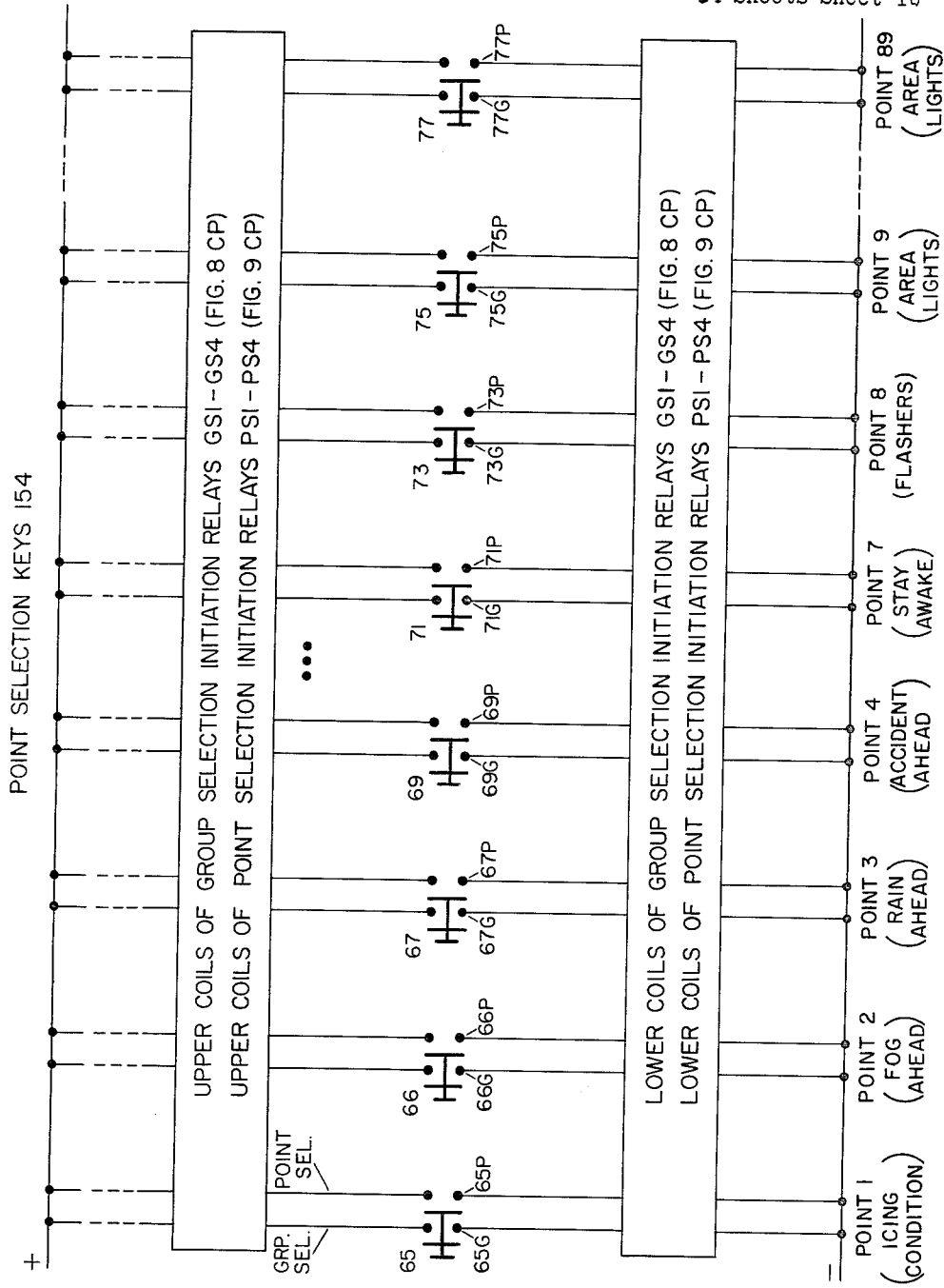

As indicated above, the point code start relays *s*1–*s*10 control the transmission of signals from the Controlled Station CS–1 to the central office 12. As shown in FIGURE 7, as a code start relay *s*1–*s*10 operates, a set of four relays including *og*1, *os, tc, tr* operate in sequence to effect the transmission of pulses over contacts *tr*4, *tr*5 to the line channel L1, L2.

A line or receiving relay 1*n* operates responsive to the impulses coupled to the line by transmitting relay *tr*, and also in response to pulses coupled to the line by the transmitting relay, such as *tr*, at any Controlled Station CS–1 to CS-last or the Control Station 12. Line relay, such as 1*n* (FIGURE 7) has its contacts 1*n*1 connected to control a counting chain *c*0–*c*5 to count the impulses in each code on channel L1, L2. Counting chain *c*0–*c*5 has contacts *c*0–1, *c*5-last connected to register the identity of the received code on register relays *r*1–*r*5, which in turn are operative at contacts *r*1–1, *r*5-last to control the group selection relays (FIGURE 12) and point selection relays (FIGURE 10) in selection of the point indicated by the received code, and motor control circuit 132 (FIGURE 3) in the operation of the sign mechanism to display the legend assigned to the selected point. Register relays *r*1–*r*5 are also operative to control the identification check code relays 1A, 1D (FIGURE 7) in determining the nature of the check code to be transmitted to the Control Station after point selection and after a control function.

The Controlled Station CS–1 is energized by a local battery source (not shown) or a battery eliminator which may be connected to a local 110-volt alternating current source, such as illustrated source 88 (FIGURE 2).

Figure 9:
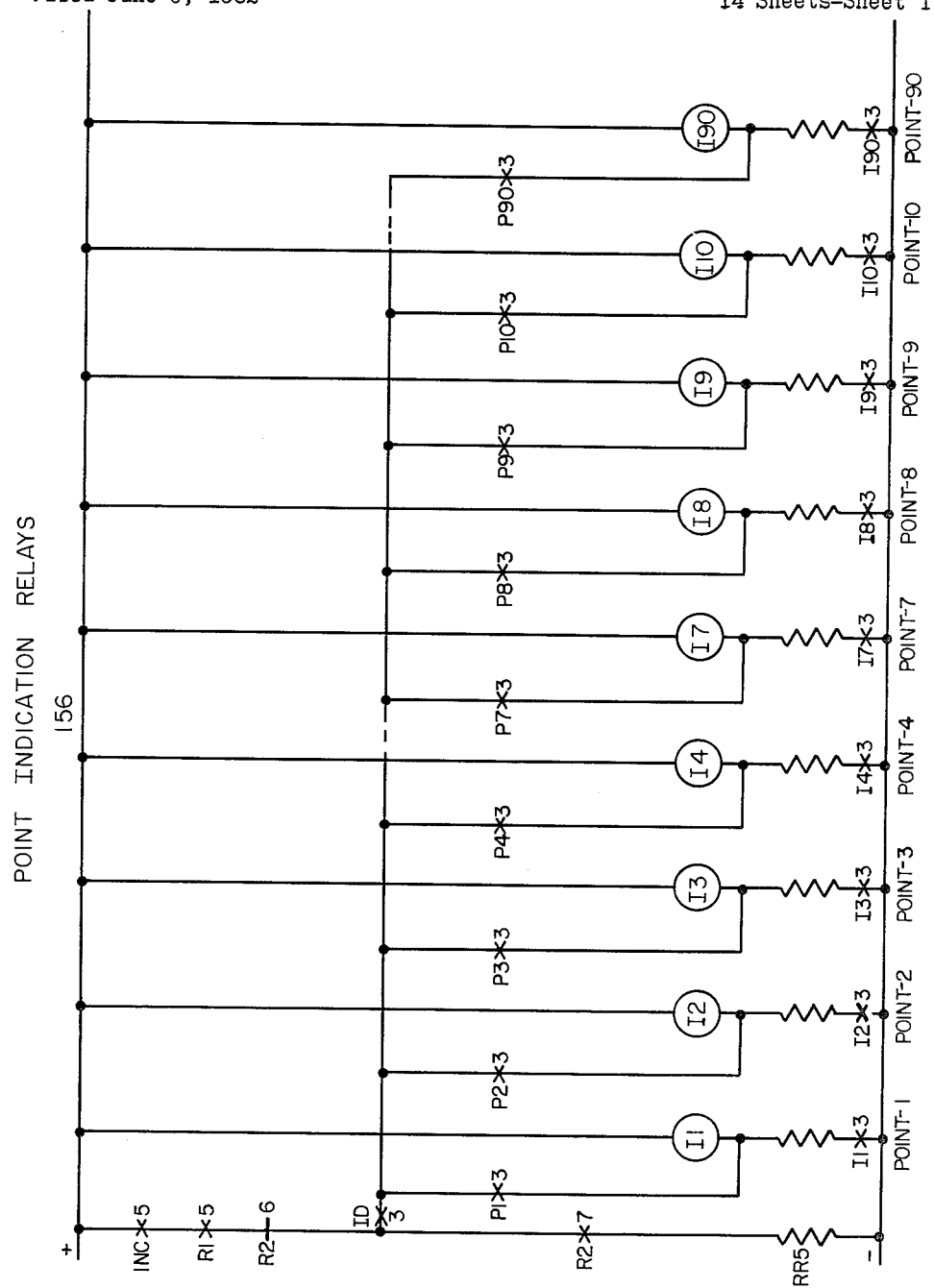
Figure 10:
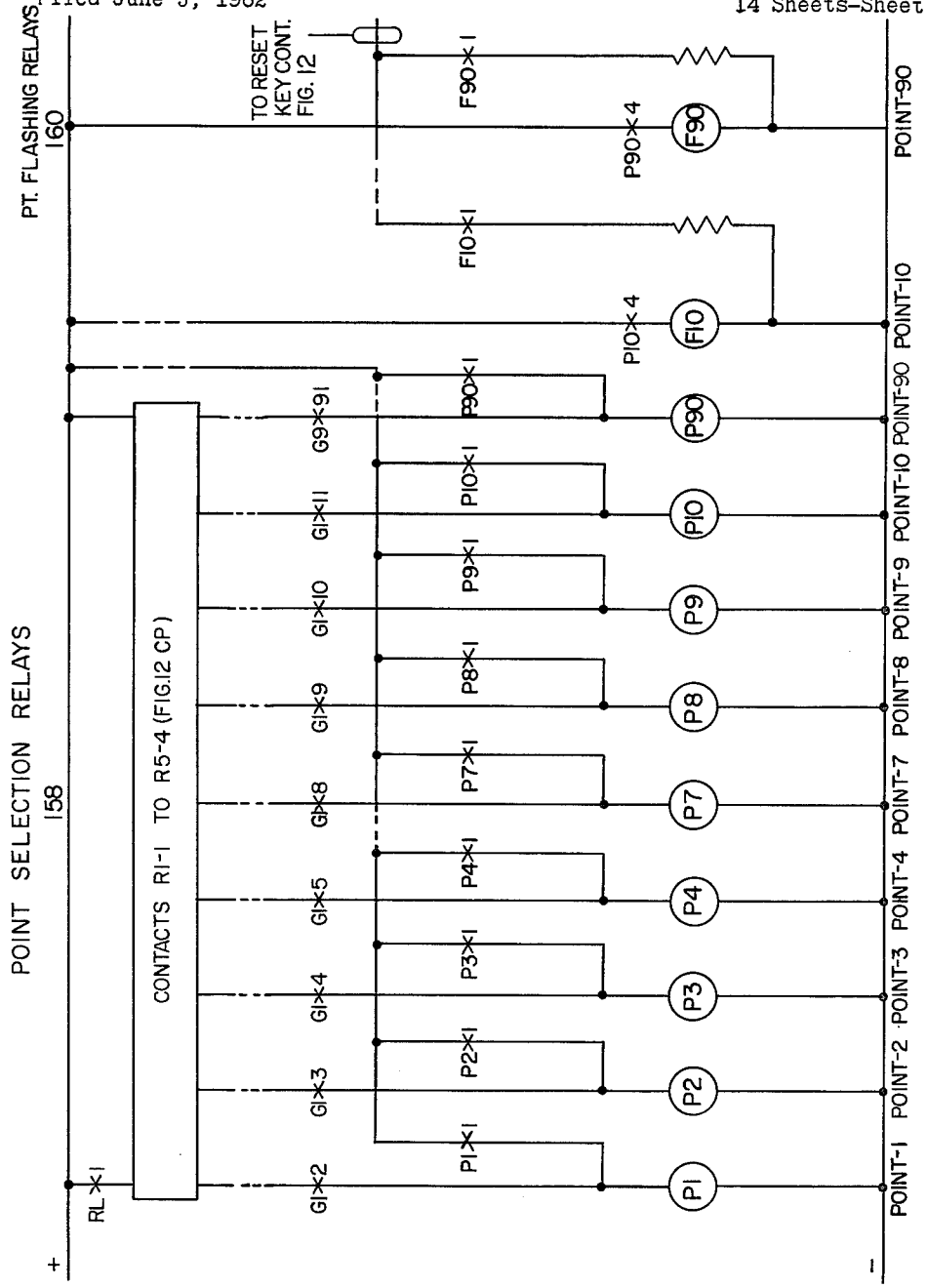
Figure 11:
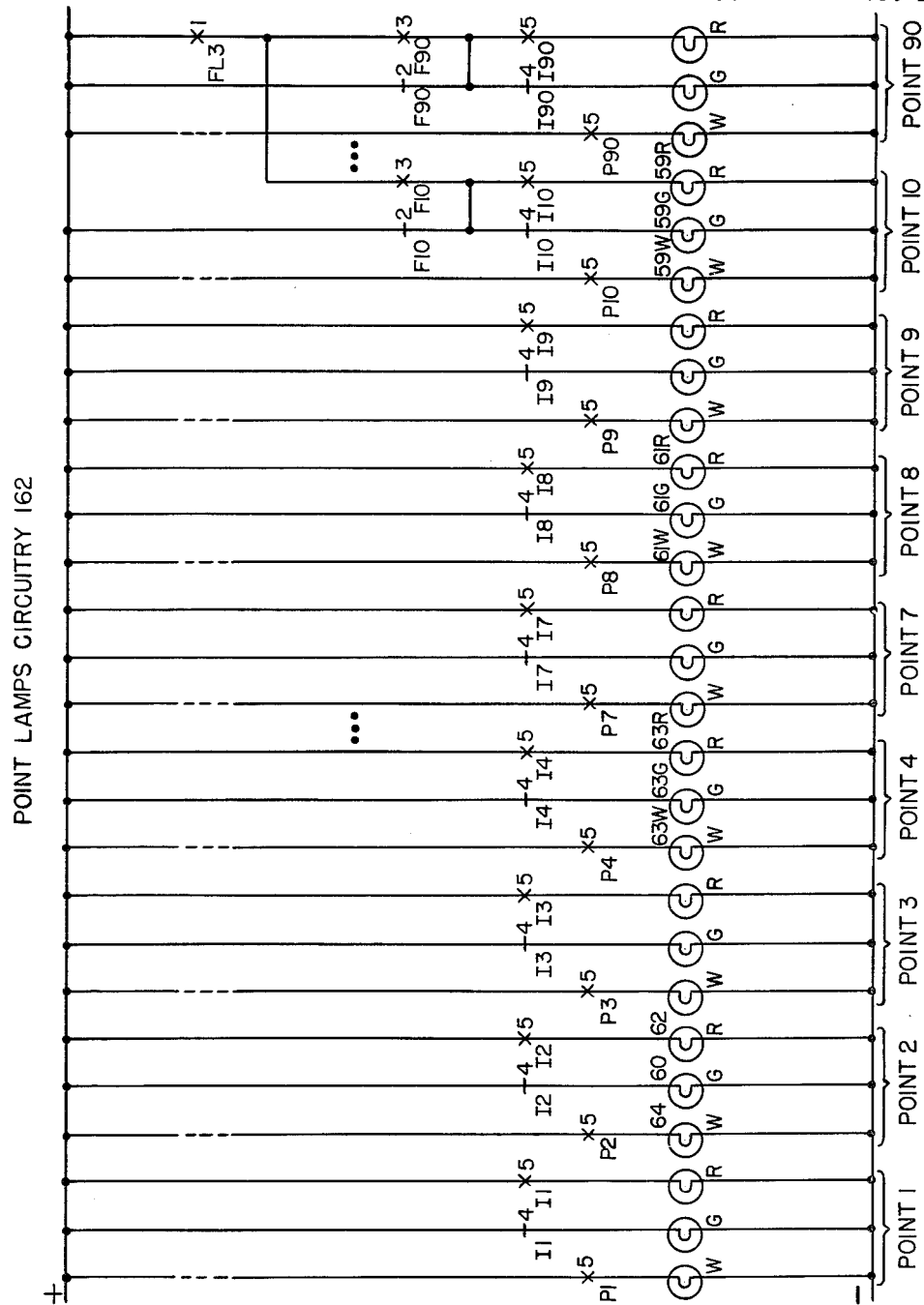

The equipment at the Control Station 12 which is located in housing 13 is shown in FIGURES 8–12, and is similar to the equipment at the Control Station set forth in the copending application. With reference thereto, the push buttons on the control panel 38 (FIGURE 1A) are shown in the circuit diagram of FIGURE 8 and indicate the manner in which closure of one group point selection key 65–77 to control group and point indication relays GS1–GS4, PS1, PS4 in the operation of a corresponding one of the group selection relays G1–G9 (FIGURE 12) and one of the group of point selection relays P1–P90 (FIGURE 10). Group initiation relays GS1–GS4 are also operative to initiate the transmission of a code by transmitting equipment (FIGURE 12) including relays OS, TC, TR, to select the corresponding group in the system at the Control Station and the Controlled Station.

Control Station line relay LN is connected to channel L1, L2 and operates as the code is transmitted, and contacts LN1 thereon are connected to drive counting chain C0–C5 (FIGURE 12) which has contacts C0–1, C5-last connected to operate register relays R1–R5 in the identification of the information identified by the coded impulse sets transmitted over the channel L1, L2. Register relays R1–R5 has contacts (FIGURE 12) connected to select the one of the group relays G1–G9 identified by the group selection codes transmitted over the channel, and a set of contacts (FIGURE 10) for controlling selection of the point identified by the point selection codes transmitted over the channel L1, L2, and a set of contacts (FIGURE 9) connected to select the point indication relays 156 for operation whenever predetermined functional codes are transmitted.

Point selection relays 158 include contacts P1–3, P90 (FIGURE 9) connected with contacts R1–5, R2–6, etc., on the register relays R1–R5 to control operation of point indication relays 156 (I1–I90—FIGURE 10) which are similar to the indication relays of the copending application and identified in like manner. Each of the point indication relays I1–I90 is operative to control energization of the red and green indicating lamps 60, 62 for its associated point to indicate whether or not the message for such point is being displayed at the associated station.

Point flashing relays 160 (FIGURE 10) are similar to relays F10, F90 of the copending application and are operative to signify that a remote device has changed position without supervisory control. Each point flasher relay, such as F10, controls alarm lamps, such as 42, to indicate that the traffic has stopped in the vicinity of its associated sign.

Point lamp circuits 162 (FIGURE 11) control the energization of the OFF, ON and selection lamps, such as 60, 62, 64 for point 2, and are controlled by contacts on the point indicator relays I1–I90 and the point selection relays P1–P90. Control keys 164 (FIGURE 12) include an alarm key 46, reset key 48, check keys 50, 52, 54, OFF key 56, ON key 58, connected to control the different components in the control circuitry shown in block form herein, and in detail in the copending application.

*Signal transmissions*

The code signals for operating the circuitry at the Control and Controlled Stations is transmitted over the chanels L1 and L2 in a pattern similar to that set forth in the copending application. By way of example, in the event that the attendant at the Control Station 12 desires to change the legend or message which is displayed by one of the signs, such as Sign 1, in the system, the attendant will operate the point selection key on the control panel 38 (FIGURES 1A, 8) for the one of the messages which is to be displayed on the sign, and as a result thereof, the circuitry at the Control Station 12 transmits the group and point selection code over channel L1, L2 to effect the selection of the point at the Controlled Station to which the message is assigned. Such code comprises two sets of six impulses each, each of which codes includes two elongated spaces, the positions of the elongated spaces in one code identifying the group to be selected, and the position of the elongated spaces in the second code identifying the point to be selected.

As a result of the selection of the point at a Controlled Station, the circuitry thereat sends back an indication code over the channel L1, L2 to the equipment at the Control Station 12 indicating that the message is not presently displayed by the sign, i.e., a group of six impulses in which the spaces after the second and third impulses are elongated in the present system, and the circuitry at the Control Station 12 maintains the OFF green lamp on the panel for the selected point in the energized condition, and the red ON lamp for such point de-energized. Additionally the white selection lamp 64 is now energized to indicate to the attendant that the point has been selected for control in effecting display of the message assigned to such point.

The attendant now operates the common ON key 58, and the Control Station equipment sends the ON code (a set of six impulses in which the spaces after the second and fifth pulses are elongated in the present system) over the channel L1, L2 to the equipment at the selected point, and the circuitry at the selected Controlled Station including the selected point effects operation of the sign to the desired position, and further transmits an ON indication code (a set of six impulses in which the spaces of the second and fifth impulses are elongated) back over the channel L1, L2 to the Control Station 12 to effect the extinguishment of the green OFF lamp on the panel for the selected point and energiaztion of the red ON lamp for such point. The Control Station then transmits the ON indication check code to the Controlled Station, followed by a reset signal, (a set of six impulses in which the spaces after the third and fourth pulses are elongated followed by an elongated pulse). The signal transmission pattern for effecting point selection and a change in the message on a sign in brief summary is as follows:

| Code: | Transmitted from |
|---|---|
| Group selection | Control station. |
| Point selection | Control station. |
| Indication code | Controlled station. |
| Control code | Control station. |
| Indication code | Controlled station. |
| Indication check and Reset signal | Control station. |

As indicated heretofore, the system is also operative to provide automatic reporting of information from each of the stations to the central station. In the present system, certain points have been connected to report information relative to the traffic flow in the vicinity of a station, and specifically to report a stoppage in the traffic flow. Such reporting is similar to the reporting operation effected in the copending application with the "Reporting of a Circuit Breaker Opening."

The pattern of signal transmission in such event is initiated by a transmission by the reporting Controlled Station of the group and point selection codes for the panel at the station which is assigned to such function followed by the OFF indication code which effects energization of the green OFF lamp on the escutcheon panel for the assigned point in the corresponding station, and extinguishing of the ON lamp 62 on the same panel. The Control Station then transmits the OFF indication check code followed by a reset signal.

The signal transmission pattern for automatic reporting may be briefly set forth as follows:

| Code: | Transmitted from |
|---|---|
| Group selection | Controlled station. |
| Point selection | Controlled station. |
| Indication | Controlled station. |
| Indication check | Control station. |
| Reset | Control station. |

*Operation by attendant to change sign display*

The manner in which the attendant energizes the system to effect coded signal transmissions to control the circuitry in the operation of the sign mechanism at a specific station, the manner in which the sign mechanism at the station provides marking signals for indicating the position thereof to its associated circuitry, and the manner in which the circuitry transmits coded signals back to the Control Station to effect such indications on the panel to the attendant are now described.

It is initially assumed that the belt 70 (FIGURE 2) for Sign 1 at Controlled Station CS1 (which has points 1–10 of the system assigned thereto) is positioned with the legend FOG AHEAD located in the window area 36 of sign housing 16. With reference to FIGURES 1A and 1B, the green lamp 69 on the escutcheon for Sign 1, Point 2 (the point assigned to FOG AHEAD for the first station) will be extinguished, and the red ON lamp 62 will be energized. The green OFF lamp 60 on the escutcheon plates for the other points PT1, PT3–PT7 assigned to the first station will be energized, and the red ON lamp 62 on such plates will be extinguished. Accordingly, the attendant can determine at a glance that the sign at Station one is displaying FOG AHEAD.

Assuming now that the attendant receives word from the highway patrol, or some other reliable source, that an accident has occurred on the roadway at a point beyond Sign 1, and that for safety purposes the display of the legend ACCIDENT AHEAD is desired at the Sign 1 location, and that the flasher equipment 28 at such sign is to be operated to aid in attracting the attention of the motorist to such display.

The attendant first operates the selection key on the escutcheon plate at point four on the control panel 38 (first row, fourth point) and the control circuitry (FIGURES 8–12) is automatically operative to send a group and point selection code to select point four at the Control Station 12 and Controlled Station CS–1. The circuitry (FIGURES 2–7) at the Controlled Station CS–1 is next operative to send an OFF indication code to the equipment at Control Station 12 to effect the energization of the white selection lamp on the escutcheon plate at point four. The attendant now operates the ON key 58, and the control equipment transmits the ON code to the Controlled Station CS–1 which controls the sign to change the display from FOG AHEAD to ACCIDENT AHEAD, and to return a signal to the Control Station 12 indicating such change has been made. The equipment at Control Station 12 thereupon effects extinguishment of the OFF lamp on escutcheon plate for point four and the energization of the red ON lamp at point four.

The Control Station then sends the ON indication check code to the Controlled Station and a reset signal which effects conditioning of the equipment at both stations for further control operations. The attendant may now operate the selection key at point eight, and the equipment is operative to effect the transmission of code signals in a similar manner to effect energization of the flashers 28 at Controlled Station CS–1. In that the equipment at point two (FOG AHEAD) has in effect changed position, the equipment effects automatic reporting of such change to correct the display on the escutcheon plate for point two (i.e., green OFF lamp energized, and red ON lamp de-energized).

With reference now to FIGURES 2–12, the specific manner in which the equipment effects such control is set forth in detail. Specifically, as the attendant operates the selection key 69 (FIGURE 8) at point four to effect changing of the message displayed on Sign 1 from FOG AHEAD to ACCIDENT AHEAD, the contacts 69g, 69p close to complete the energizing circuit for the group and point selection equipment GS4 and PS4 at the Control Station 12. Relay GS4 operates and at its contacts (FIGURE 12) energizes the outgoing start relay OS which operates and at its contacts OS10 energizes relay TC, which operates and at its contacts TC7 energizes the transmitting relay TR. The transmitting relay TR at its contacts TR4, TR5 transmits impulses over the channel L1, L2. In the present example a group selection code is transmited over conductors L1, L2, which is comprised of a set of six spaced impulses, the spaces after the first and second impulses being elongated to select group one in the system (Station 1). Line relay LN at the Control Station operates as the code is coupled to the line, and at its contacts LN–1 drives counting chain C0–C5, which at its contacts C0–1, C05-last effects registration of the code identity on register relays R1–R5 which at its contacts R1–1, R5-last effects selection of the group relay G4. As the point selection code for point four, comprised of six spaced impulses in which the spaces after the second and third pulse are elongated, is transmitted over channel L1, L2 by transmitting relay TR, line relay LN at the Control Station effects operation of the counting chains C0–C5 and register relays R0–R5 in the selection of point selection relays P4 (FIGURE 10) over a circuit including contacts G1–4 in the group relay G4 and contacts on register relays R1, R5.

Thus, as a result of the operation of selection key 69 at point four and the transmission of the group and selection codes, the point selection relay P4 will be energized at the Control Station 12.

At the Controlled Stations CS–1 to CS-last, the group selection code transmitted over the channel L1, L2 operates the line relay 1n at each of the Controlled Stations CS–1 to CS-last, which at its contacts 1n1 drives the counting circuit C0–C5 thereat to register the group and point selection codes which are transmitted over the channel L1, L2.

However, before describing such operation, it will be first recalled that the sign at station 1 is presently displaying FOG AHEAD (point two), and, accordingly, the indication relay i2 for point two is operated and indication relay 14 for point four is in the restored position. That is, as shown in FIGURE 2, the legend FOG AHEAD is presently displayed in the window area 36 of the sign, and as a result thereof roller fingers or arms $a$ and $c$ on the first and third microswitches 94 and 98 extend through the apertures at positions 1 and 3 on the belt 70, and into contact with the cooperating grooves on the aluminum roller 90.

As a result of the depression of the arms $a$ and $c$ on microswitches 94 and 98 through the apertures 1, 3 on belt 70 and into the receiving groove of the roller 90, microswitches 94 and 98 are operative to complete energizing circuits for the first and third marking relays 116 and 120 (FIGURE 3). The circuit for relay 116 extends from positive potential (FIGURE 3) over the positive potential conductor 114 in cable 14, over the closed contacts of microswitch 94, conductor 104, cable 14 and relay 116 to negative potential. The circuit for the third marking relay 120 extends from positive potential over conductor 114, cable 14, closed contacts on microswitch 98, conductor 108 in cable 14 and over the winding of relays 120 to negative potential.

With the first and third marking relays 116 and 120 operated, a circuit is completed for the code check relay 130 which extends from positive potential over contacts 1–2, 2–3, 3–4, 4–4, 5–2 and the winding of code check relay 130 to negative potential. The two-out-of-five check circuit 126 is well known in the art, as for example, as shown at page 428 of "The Design of Switching Circuits," Keister, Richie and Washburne, and as there shown, the two-out-of-five check fan 126 will complete a circuit to the winding of code check relay 130 only if two out of five relays 126–124 are operated at any time.

The code check relay 130 and the first and third marking relays 116 and 120 are also effective at their contacts 8–1, etc., in the decoding circuit 142 (FIGURE 4) to complete an energizing circuit for the point indication relay i2 for point two, the circuit extending from positive potential over contacts 8–1, 1–3, 2–5, 3–6 and i2–5 and the winding of relay i2 to negative potential.

It is thus apparent that during such period as the sign mechanism at a station is operative to display a legend, the marking apertures on the belt 70 associated with such legend will control microswitches 94–102 to effect the identification of the displayed legend on the marking relays 116–124 in the two-out-of-five code, and such marking will maintain energized the point indication relay, such as i2, for the point assigned to the legend.

As the line relay 1n operates in response to receipt of the group selection code, it is effective at its contacts 1n1 to operate the counting chains c0–c5 which at its contacts c0–1, c5–last registers the identity of the received group or register relays R1–R5 and the register relays at contacts r1–1, r5–last select the group relay indicated by the code. In that the group 1 code has been transmitted, and the points at station CS1 are assigned to the first group, only the group relay g1 at the station CS–1 prepares the point selection equipment (FIGURE 6) for selection by the point selection code as now received over channel L1, L2.

As the point selection code is received, relay 1n at contacts 1n1 drives the counting chain c0–c5 which at contacts c0–1, c0–last registers the identity of the point selection code on the register relays r1–r5.

Register relays r2, r3 operate as the point selection code for point four is received, and at their contacts r2, r3 (FIGURE 6) complete a circuit over group relay contacts g1–5 to point selection relay p4.

Point selection relay p4 operates and at its contacts p4–3 prepares a circuit for point indication relay i4. However, since the sign is not now displaying the legend assigned to point four (FOG AHEAD) the decoding circuit 142 does not extend the operating circuit to relay i4 and relay i4 remains restored.

As the point selection relay p4 operates, it is also effective at contacts to control conditioning of the circuits at the Controlled Station CS–1 to transmit the indication code over the channel to indicate the condition of the equipment at the selected point four (i.e., OFF). In the present example, transmitting relay tr in the Controlled Station CS–1 is operative at its contacts tr4, tr5 to transmit the OFF indication code, a set of six spaced impulses in which the spaces after the second and third impulses are elongated.

Line relay LN, 1n (FIGURES 12, 7) at the Control Station 12 and Controlled Station CS–1 operates in response to the impulses of the OFF indication code and at contacts LN1, 1n1 control the counting chains C0–C5, c0, c5, respectively to register the code on register relays R1–R5, r1–r5. At the Control Station 12 register relays R1, R2 at contacts R1–5, R2–6 (FIGURE 9) prepare an operating circuit for the one of the point indication relays associated with the selected point (relay I4 for point four in the present example). The indication relays 1A–1D (FIGURE 12) now check for agreement of the information displayed at point four with the information received by the register relays R1–R5.

In that the indication code received (the OFF code) is consistent with the display provided by the energized green lamp 63g on the panel for point four, the indication relay contacts 1D3 (FIGURE 9) remain open and the point indication relay I4 for point four is not energized. Green lamp 63g at point four remains energized, and the red lamp 63R remains off.

Relay 1A (FIGURE 12) operates to effect completion of the circuit prepared to the white selection lamp 63W by point selection relay P4. As the energization of the white lamp at point four is observed, the attendant depresses the ON key 58 for the purpose of initiating the transmission of a code which effects operation of equipment at the Controlled Station CS–1 to adjust the sign to display the legend ACCIDENT AHEAD in the display area 36.

More specifically, as the ON key 53 is operated it is effective in the manner of close key in the copending application to initiate the transmission of the close code by the transmitting relay TR which code in the present example, comprises a set of six spaced impulses in which the spaces after the second and fifth pulses are elongated.

The line relay 1n at contacts 1n–1 at the Controlled Station CS–1 drives the chain C0–C5 to register the incoming control code on the register relays R1–R5, and specifically to operate relays R2, R5 and thereat initiates operation of the sign mechanism in the adjustment of the legend ACCIDENT AHEAD to the display area. That is, as a result of the receipt of the control code, the register relays r2–r5 and incoming code relay INC are operated, and at contacts r2–11, r5–9, and inc12 (FIGURE 3) complete a circuit for the motor control relay 134 (FIGURE 3), the circuit extending from positive potential over contacts inc12; r2, 11; r5, 9; p4, 8 (point selection relay p4 having been operated as the result of receipt of the point selection code) and the winding of motor control relay 134 to negative potential.

Motor control relay 134 operates and at its contacts 136 completes the energizing loop for the motor control circuit 79 to effect energization of the motor 76 from the 110 volt alternating current source 88.

As motor 76 now operates, (i.e., as the result of the selection of point four and completion of the energizing circuit to the motor 76, it is effective to operate shaft 78 to effect rotation of the aluminum roller 72 in the counter-clockwise direction. As the upper roller or cylinder 72 rotates, the endless belt 70 which is supported by rollers 72 and 74 and roller 90 are rotated. As the groove 89 on roller 90 and apertures a, c move away from the fingers a, c, on the microswitch device 94–102 which engaged the first and third apertures when the sign displayed the legend FOG AHEAD, the fingers a, c are moved out of the apertures to ride upon belt 70. Microswitches 94 and 98 thereupon open their associated contacts to interrupt the energizing circuit for the first and third marking relays 116, 120 (which have been operated to indicate the display of the FOG AHEAD legend). Marking relays 116 and 120 release and at contacts 1–1, 3–4 (FIGURE 3) interrupt the circuit for the code check relay 130, which restores and at contacts 8–1, etc., restores point indication relay i–2.

As motor 76 operates to rotate the belt 70, the legend RAIN AHEAD approaches the display area and the two apertures associated therewith (apertures at the first and fourth position in the two-out-of-five code) control feeler arms a and d to complete an operating circuit for the first and fourth relays 116, 122, and check relay 130 in the manner described. Marking relays 116 and 112 operate with code check relay 130 to extend an operating potential over the decoding circuit 142 (FIGURE 4) for the point indication relay i3, the circuit extending from positive potential over contacts 8–1, 1–3, 2–5, 3–7, and 4–5 to contacts p3–3 which are open (point 3 is not the selected point in the given example) and accordingly indication relay i–3 will not operate.

The motor 76 continues to drive the roller 72, whereby roller 90 urges the feeler arms a, d upwardly out of the first and fourth apertures and microswitches 94 and 100 open their contacts to effect release of marking relays 116 and 122, which release code check relay 130.

With continued rotation of belt 70, the legend ACCIDENT AHEAD is moved into the display area of Sign 1, and apertures 1 and 5 on the belt 70 associated with the legend ACCIDENT AHEAD permit feeler contacts a, e on microswitches 94 and 102 to be depressed into the receiving groove on roller 90 (which has again moved into position adjacent the fingers) to thereby effect closing of the contacts on microswitches 94 and 102. Microswitch 94 operates and at its contacts completes a circuit to marking relay 116 as heretofore described. Microswitch 102 operates and at its contacts completes a circuit to the fifth marking relay 124, the circuit extending from positive potential over conductor 114 in cable 14 to the closed contacts of the fifth microswitch 102, and over conductor 112 in cable 14 to the winding of the fifth marking relay 124 and negative potential.

Marking relays 116 and 124 operate and at contacts 1–1 and 5–1 complete a circuit for the code check relay 130, the circuit extending from positive potential over conductor 114 in cable 14 to the closed contacts of the fifth microswitch 102, and over conductor 112 in cable 14 to the winding of the fifth marking relay 124 and negative potential.

Code check relay 130 operates, and at its contacts 8–1 is operative with the contacts in the first and fifth marking relays 116 and 124 to complete an energizing circuit over the decoding circuit 142 for the indication relay i4 at point four, the circuit extending from positive potential over contacts 8–1, 1–3, 2–5, 3–7, 4–6, 5–3 and p4–3 (the operated one of the point selection relays in the present example) and the winding of relay i4, negative potential. Point indication relay i4 operates, and at its contacts i4–5 locks independent of the contacts p4–3 on point selection relay p4.

As noted in the copending application, as a point indication relay, such as i4, changes its position, it is effective at its contacts i4–1, i4–4, or i4–3, i4–2, to effect the reversal of the flow of current through its associated point code start relay, such as s4–4. In the present example, contacts i4–1, i4–4 open to interrupt the flow of current through relay s4 in one direction, and contacts i4–3 and i4–2 close to reverse the direction of current flow through the winding of relay s4, and relay s restores.

The operation of a point code start relay, such as s4, is effective as described in the copending application to interrupt the holding circuit for the register relays r (including relays r2, r5 which have been operated in the present example) to effect the release of relay inc and the interruption of the energizing circuit for the motor control relay 134. As motor control relay 134 restores, it is effective at its contacts 136 to interrupt motor control circuit 79 for the sign mechanism, and the motor control circuit operates to effect braking of the motor and termination of further movement of the sign.

Additionally, the relay s4 releases and at its contacts (FIGURE 7—s1–s10) at the Controlled Station operates outgoing start relay og1 to initiate the generation of the closed indication code (a set of six spaced impulses in which the spaces after the second and fifth pulses are elongated) for transmission to the control station 12 to indicate to the equipment thereat that the legend associated with the selected point four has been moved to the display area 36 on the sign housing (ACCIDENT AHEAD, point four in the present example).

Figure 12:
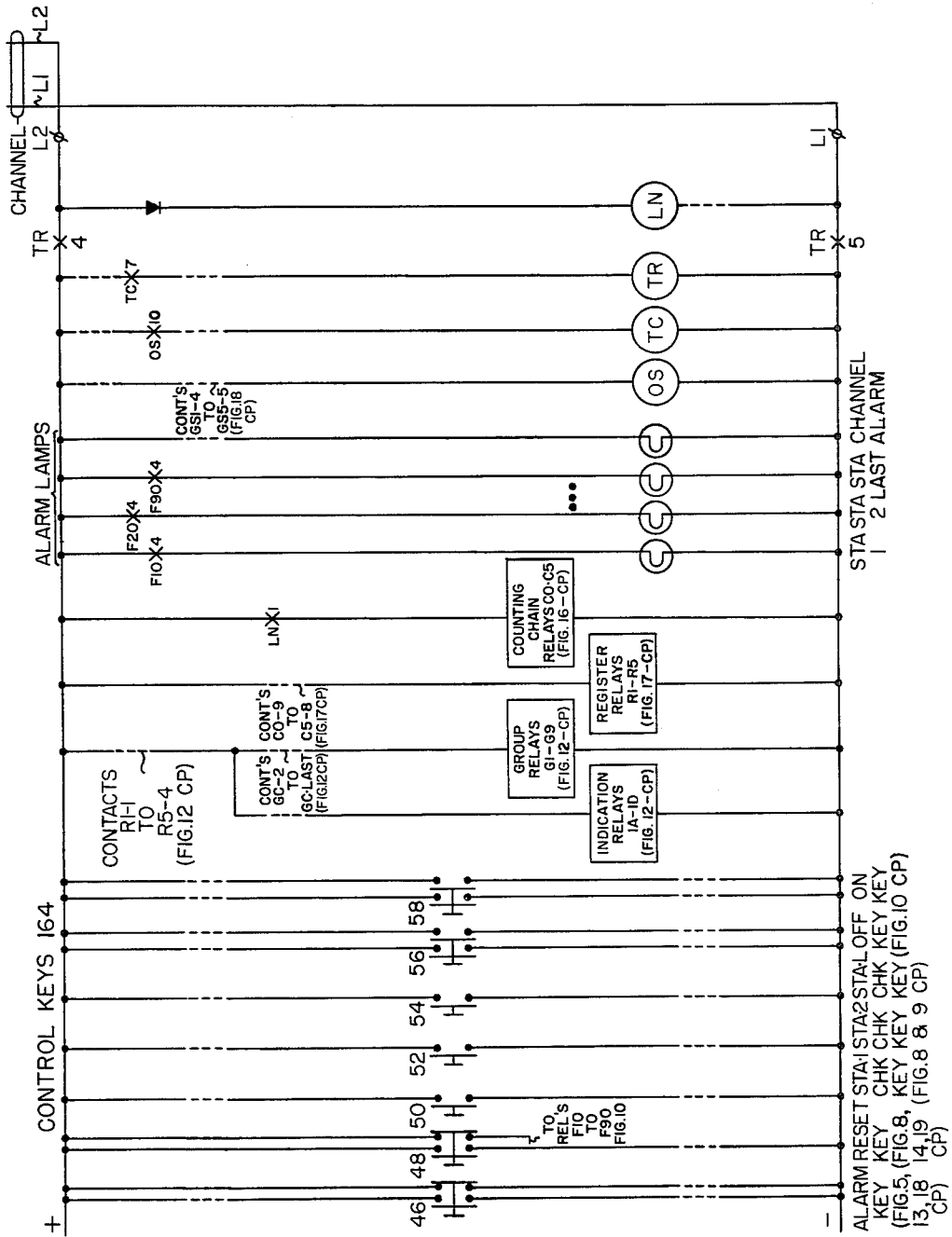

As the Controlled Station transmits the ON indication code (closed code in the copending application), the line relay LN at the Control Station 12 is operative to drive the counting chain C0–C5 to register the incoming code on the register relays R1–R5, which in turn effects operation of the indication disagreement relay 1D (FIGURE 12).

Relay 1D operates and at its contacts 1D–3 (FIGURE 9) completes the energizing circuit for indication relay I–4, (+, 1–4, P4–3, 1D–3, R2–7, RR5, —). Indication relay I–4 operates and at its contacts I4–4 (FIGURE 11) opens the circuit for green lamp 63g and at its contacts I4–5 closes the circuit for red lamp 63R.

Indication agreement relay 1A (FIGURE 12) now operates to initiate the transmission of the closed indication check code by transmitting relay TR, the code comprising a group of six impulses in which the spaces after the third and fourth pulses are elongated followed by a reset signal which consists of an elongated pulse. The line relay 1n at the Controlled Station CS–1 operates the counting chains c0–c5 to register the identity of the code on register relays r1–r5, which in turn operate to effect release of the energized one of the point selection relay p4. Relay p4 restores, and relay p4–3 (FIGURE 4) interrupts the original energizing circuit for relay i4. Relay i4 at point four is maintained operated over the closed contacts i4–5 and the decoding circuit 142.

When the system resets, the changed position of point indication relay i2 effects release of the associated point code start relay s–2 to initiate the automatic reporting of an OFF indication at point two for Sign 1, whereby the red lamp 62 at point two is extinguished, and the green lamp 60 is energized.

*Operation of flashers*

As indicated above, certain information displayed by the signs may be considered to be more urgent than other of the information displayed thereby, and in such event attention of the motorist is desirably attracted to the sign by suitable visual aid. As shown in FIGURE 1, a flasher device 28, which may be any one of a number of commercially available units, is connected to the control equipment for point eight at Controlled Station CS–1. Each of the other Controlled Stations CS–2 to CS–last is similarly equipped at point eight.

In the present example, it was assumed that the attendant selected point four at Sign 1 for the purpose of changing the display on Sign 1 to ACCIDENT AHEAD. Such display was accomplished by selecting point four and operating the ON key 58. It is now further assumed that the attendant desires to effect operation of flashers 28 adjacent the sign for the purpose of attracting the attention of the motorist to such display. Accordingly, the attendant momentarily depresses the selection key on the escutcheon plate at point eight for Sign 1. The equipment at the Control Station 12 thereupon sends the group code followed by the point code to effect selection of point eight at Controlled Station CS–1, and as a result relay p8 (FIGURE 1) will be operated. The equipment at the Controlled Station CS–1 thereupon returns the OFF indication code to the Control Station 12 to operate point selection relay P8, and thereby effect operation of the white selection lamp 61W (FIGURE 11), which is located on the flasher escutcheon plate at point eight to indicate to the attendant that the system has selected the flasher equipment at Controlled Station CS–1. In that the green OFF lamp 61G on such escutcheon plate was previously illuminated the return code will effect no change in the status thereof.

The attendant now momentarily depresses the ON key 58 (FIGURE 1A), and the Control Station equipment transmits the ON code over the channel L1, L2 to effect energization of the ON code of the latching relay 150 (FIGURE 7) at point eight in the Controlled Station circuit.

Latching relay 150 operates and at its contacts 1r–1, 1r–2, completes an operating circuit over conductors 26 to the flasher device 28 (FIGURE 1) to effect the energization thereof. The latching relay at its contacts 1r–1 (FIGURE 4) effects the release of point indication relay i8 for point eight which operates in the manner heretofore described to release the point start code relay s8 for such point. Relay s8 operates to energize the Controlled Station circuitry in the transmission of the ON indication code over the channel L1, L2 to the Control Station 12 to operate the point indication relay I-8 thereat.

Point indication relay I8 operates and at its contacts I8–4 (FIGURE 11) opens the energizing circuit for the green OFF lamp 61G and at its contacts I8–5 completes the energizing circuit for the red ON lamp 61R. Control Station circuitry thereupon sends the ON indication check code over the channel to the Controlled Station CS–1, and thereafter the reset signal.

In the event the attendant wishes to terminate operation of the flasher device 28, the point eight is selelected as described above by operation of the selection key on the flasher escutcheon plate at point eight, and after illumination of the white lamp 61W at such point, operation of the common OFF key 56.

As shown at the control panel (FIGURE 1A) each of the sign locations also has a point assigned to control the area lights located in the vicinity of each of the signs. The area lights may be turned on and off by the attendant by operating the selection key at the area light panel for a sign (such as pt9), and as selection of the point is evidenced by energization of the white lamp at such point, effecting operation of the OFF key 56 or ON key 58, as the case may be.

Each sign also has an associated point assigned to provide an indication to the attendant of the flow of traffic on the roadway adjacent the different sign locations.

With reference to FIGURE 1, the treadle, such as 24, is positioned in the roadway adjacent each of the Controlled Stations. Treadle 24 (or any suitable detection device) is connected over conductors 22 to a timer unit 20, and in the event the treadle 24 detects a termination of traffic flow for a predetermined time interval which is preset on the timer 20, the timer effects opening of its associated contacts 21 and interruption of the circuit which extends over conductors 18 to the point indication relay i–10 (FIGURE 4) in the Controlled Station CS–1.

Relay i10 restores, and at its contacts i10–4 changes the position of relay s10 which in turn controls the circuitry at the Controlled Station CS–1 to transmit the group selection code, the point selection code and the OFF indication code over the channel L1, L2 to the Control Station 12. Point selection relay at point ten operates and at its contacts P10–3 effects restoration of the indication relay I10 (FIGURE 9). Relay I10 restores and at its contacts I10–5 effects extinguishment of the red ON lamp 59R and at its contacts I10–4 effects energization of the green OFF lamp 59G.

Control Station 12 thereupon transmits the OFF indication check code followed by reset, and relay s10 at the Controlled Station CS–1 is reoperated.

When traffic resumes in such manner as to cause the treadle 24 to control the timer 20 to close its contacts 21, relay i10 in Controlled Station CS–1 operates to again drop the associated point code start relay s10 to initiate reporting of the resumption of traffic in a manner similar to the reporting operation which has been described, the signals in the present example effecting the extinguishment of the green lamp 59G at point ten and energization of the red lamp 59R at point ten.

Any time an automatic reporting occurs the associated alarm lamp, such as alarm lamp 42 for the Sign 1, will be energized. Additionally, the common alarm bell (not shown) will ring. The attendant may silence the bell by momentary operation of alarm key 46, and the alarm lamp 42 for Sign 1 may be extinguished by operation of the reset key 48.

*Conclusion*

The novel system set forth herein permits centralized pushbutton control of a plurality of signs located at spaced intervals along a roadway with a reduced amount of equipment, lower maintenance costs and reduced power requirements. The unique coded impulse operation precludes any possibility of erroneous pulsing, and the self-checking features of the system insure the proper display on each of the signs at all times. The positive visual status check provided on the novel control panel permits the attendant to determine the condition of the signs at each of the remote locations at a glance.

Automatic reporting features which are provided result in a system of greater flexibility and reliability in that an increased amount of information is provided to assist the attendant at the Control Station in his supervisory activities. Exemplary of a few of the conditions which may be automatically reported are power failures, communication failures, lamp failures, sign mechanism malfunctioning, and many others. Additionally, the system is readily adapted to include a call box similar to the conventional fire alarm call box (which would be connected to initiate reports in the manner of the treadle disclosed herein to permit the transmission of alarms by passing motorists or state highway employees in the event of an emergency, such as an accident, traffic obstruction, fire, and the like. As a result of such transmission, the system would automatically notify the operator at the control office as to both the nature and location of the alarm report (i.e., in the manner of the traffic movement reporting described herein).

The sytem also readily adapts itself to the inclusion of communication facilities, such as a telephone circuit which may be located at each (or certain) of the sign locations to place the user in direct contact with the attendant at the Control Station over the same channel which is used for the pulse transmission. Such facility may be used for maintenance purposes, or if desired, for emergency road service requests.

Telemetering can be provided over the existing channel between the stations, and such equipment would be operated in the manner of the traffic reporting device connected to point ten to indicate such things as the number of vehicles which pass the sign location, the vehicular speed past a particular sign location, the number of vehicles which pass in a certain time period, and the like.

The foregoing arrangements are exemplary of only a few of the known equipments which may be provided in the novel control system. Others which may be readily incorporated include automatic data lodging, central computer control of traffic flow, radio control from helicopters or radio use, close circuit television surveillance of critical areas, and many other forms of equipment now known in the art.

While only particular embodiments of the invention have been described and illustrated, it is apparent that modifications and alterations may be made therein. Accordingly it is the invention in the appended claims to cover all such modifications and alterations as may fall within the true spirit and scope of the invention.

What is claimed is:

1. In a supervisory control system having a central office for controlling the display of information located at each of a plurality of remote locations, a channel extending between the control office and each of said remote locations, means at each remote location including a message display sheet, and roller means operable to move said sheet to different positions to display correspondingly different messages, circuitry means at each remote station for operating said display sign to said different positions, code means for each of said messages movable with said sheet, detector means operable with movement of the sheet to each position to sense said code means including means for providing coded signals representing the sheet position as sensed, marking means for registering said code, a plurality of point indication means, each of which is operative to represent the display of a different message, decoding means controlled by said register means to operate the one of the point indication means which represents the displayed message, and signal generating means controlled by said point indication means to transmit a coded signal over said channel indicating the message displayed.

2. In a supervisory control system having a central office for controlling the display of information located at each of a plurality of remote locations, a channel extending between the control office and each of said remote locations, means at each remote location including a display sheet, and roller means operable to move said sheet to different positions to display correspondingly different sets of information, circuitry means at each remote station for operating said display sign to said different positions, code means movable with said sheet, detector means controlled with movement of the sheet to each position to sense said code means including means for providing coded signals representing the sheet position as sensed, marking means for registering said code, a plurality of point indication switches, each of which is operative to represent the display of a different message, decoding means controlled by said marking means to operate the one of the point indication switches which represent the displayed message, code start means, each of which is operated by a different indication switch, and each of which controls the generation of a different code signal, and signal means controlled by the operated one of said code start means to transmit the coded signals over said channel to identify the message displayed on said sign.

3. In a supervisory control system having a central office for controlling the display of information located at each of a plurality of remote locations, a channel extending between the control office and each of said remote locations, means at each remote location including a display sign having a display means including a display area, a message-carrying sheet member and roller means operative to move said sheet member to each of a number of different positions to display a correspondingly different message in said display area, code means operable with said sheet member, detector means operable with movement of the sheet member to sense said code means, means controlled by said detector means to generate a code signal set for transmission over said channel which indicates the information displayed in said display area, means at each remote station for detecting the change of certain traffic conditions in the vicinity of the remote location, and means operable to generate coded signals for transmission over said channel to said control office to indicate the the change detected.

4. In a supervisory control system having a central office controlling the display of information located at each of a plurality of remote locations, a channel extending between the control office and each of said remote locations, means at each remote location including a display sign having a message carrying sheet, and roller means operable to move said sheet to each of a number of different positions to display a correspondingly different message, each message having a different group and point position in the system which is selected by an assigned group and point selection code, means at each remote location for generating a first group and point selection code to identify the message displayed thereat, means at each remote location for generating a different group and point selection code for transmission over said channel to indicate a change in an environmental condition at the remote location, indicator means at said control office for each group and point selection code in the system, and means for operating the indicator means for a group and point selection code at the control office with receipt of its associated code over said channel.

5. In a supervisory control system having a central office controlling the display of information located at each of a plurality of remote locations, a channel extending between the control office and each of said remote locations, means at each remote location including a display sign having a message-carrying sheet, and roller means operable to move said sheet to each of a number of different positions to display a correspondingly different message, each message having an assigned group and point position in the system which is selected by an associated group and point selection code, selector means at said control office for controlling generation of a group and point selection code for transmission over said channel, selection means for each point at a remote location operative only with transmission of its associated group and point selection code over said channel, means at said remote location operable to generate a coded signal for transmission over the channel to identify the message displayed by the message-carrying sheet at the time of operation of said selection means, means in said control station for thereafter effecting generation of a control signal to effect operation of said roller means in the display of the message associated with the selected point, means at the remote location operative to generate an indication code for transmission over the channel to the control office with movement of the sheet to display the indicated message, and means at the control station operative to thereafter generate an indication check and reset signal for the system.

References Cited by the Examiner

UNITED STATES PATENTS

| | | | |
|---|---|---|---|
| 2,432,324 | 12/1947 | May | 340—154 |
| 2,849,701 | 8/1958 | Clark | 340—22 |
| 2,852,767 | 9/1958 | Foller et al. | 340—154 |
| 2,895,122 | 7/1959 | De Matteis | 340—147 |
| 2,903,675 | 9/1959 | Downey et al. | 340—154 |
| 2,914,662 | 11/1959 | Preston et al. | 340—163 |
| 2,945,624 | 7/1960 | Nicolaus | 340—366 |
| 2,964,742 | 12/1960 | Godet | 340—378 |
| 3,047,852 | 7/1962 | Smith | 340—154 |
| 3,094,682 | 6/1963 | Brosh et al. | 340—154 |
| 3,200,375 | 8/1965 | Lutz | 340—147 |

NEIL C. READ, *Primary Examiner.*

P. XIARHOS, *Assistant Examiner.*